Aug. 21, 1962
H. RUBEN
3,049,811
ARTIFICIAL HUMAN BODY FORM FOR DEMONSTRATING
REVIVING OF UNCONSCIOUS PERSONS
Filed Nov. 9, 1959
3 Sheets-Sheet 1
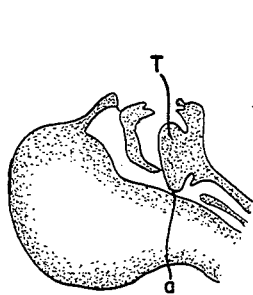
FIG.I.
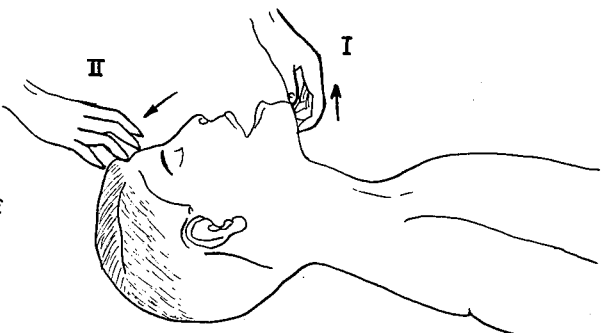
FIG.2.
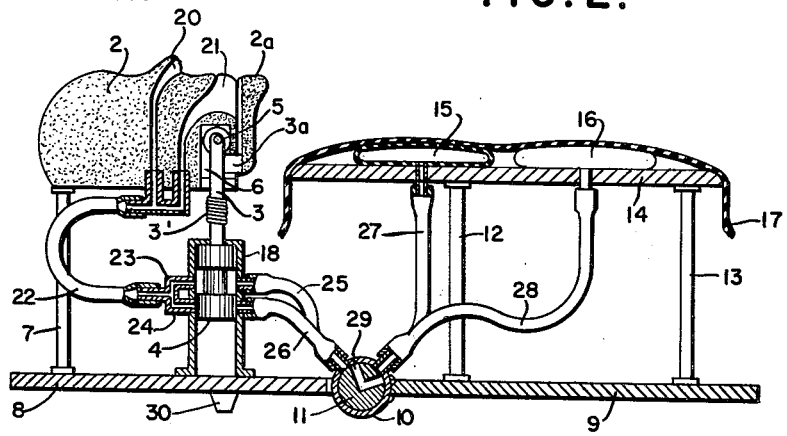
FIG.3.
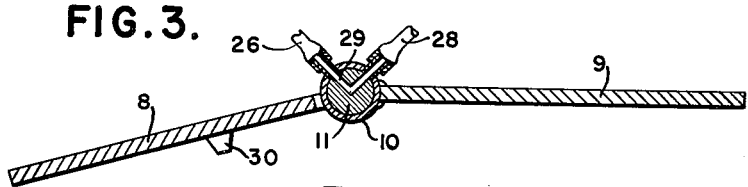
FIG.4.
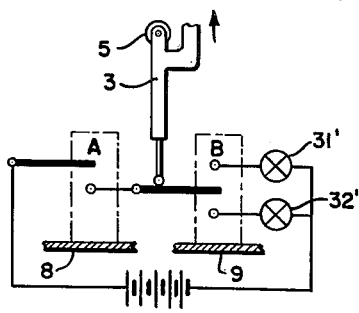
FIG.5.
*INVENTOR*
Henning Ruben
BY *George H. Spencer*
*ATTORNEY*

Aug. 21, 1962  H. RUBEN  3,049,811
ARTIFICIAL HUMAN BODY FORM FOR DEMONSTRATING
REVIVING OF UNCONSCIOUS PERSONS
Filed Nov. 9, 1959  3 Sheets-Sheet 2

INVENTOR
Henning Ruben

BY *George L. Spencer*

ATTORNEY

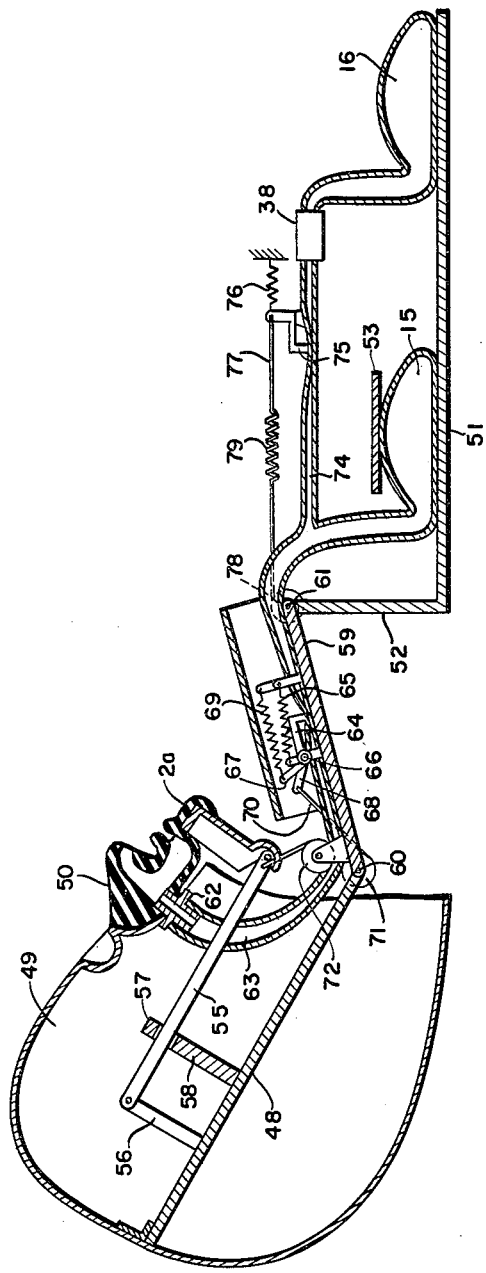

United States Patent Office 3,049,811
Patented Aug. 21, 1962

3,049,811
ARTIFICIAL HUMAN BODY FORM FOR DEMONSTRATING REVIVING OF UNCONSCIOUS PERSONS
Henning Ruben, Kopenhama-Lyngby, Denmark, assignor to Holger Hesse, Lyngby, Denmark
Filed Nov. 9, 1959, Ser. No. 851,868
Claims priority, application Germany Nov. 10, 1958
13 Claims. (Cl. 35—17)

The present invention relates to an apparatus for demonstrating and teaching the resuscitation of drowned persons by insufflating air into the lungs of the unconscious victims with the aid of mechanical devices or from the lungs of a rescuer. The teaching of proper reviving steps is of great importance to persons, such as physicians, personnel in hospitals, emergency stations, and of ambulances, firemen, rescue workers in manufacturing plants and mines, swimming instructors, members of the Red Cross, the armed forces, and civil defense organizations, etc. The novel demonstrating and teaching apparatus is also of great value for training students in general, because it is important that the proper application of reviving steps will become universal knowledge.

This is desirable in view of the fact that successful resuscitation can be accomplished by means of proper life-restoring apparatus only, if prompt action is taken, whereby minutes or even fractions thereof, are decisive and professional help is not always available in such a short time. Therefore, everybody should be trained to be able to revive a drowned person in case of an emergency.

It is the purpose of the resuscitating steps to restore breathing as quickly as possible. This is usually done by removing from the respiratory organs of the unconscious persons water or foreign matter, such as dirt, by means of a suction pump or aspirator, whereupon air is insufflated into the lugs of the victim either from the lugs of the rescuer or by means of a respirator via a fan or breathing mask. In unconscious persons, the windpipe is frequently blocked because the lower jaw is dropped, whereby the tongue blocks the windpipe. The block can be removed by a rescuer if the latter bends the head of the unconscious person well backwards. In addition to this, the lower jaw of the unconscious should suitably be lifted. Therefore, a rescuer should be trained to place the head and the jaw of the unconscious person in such a position, that air can be fed unhindered to the lungs. The air should be supplied under proper pressure and at the proper velocity as, otherwise, the air will enter the unconscious person's stomach and inflate the same.

The following conditions are of importance with respect to the proper respiration of the unconscious person, i.e., for the supply of air to his lungs:

(a) The proper, i.e., backwards-bent position of the head;
(b) The properly lifted position of the lower jaw;
(c) The proper air supply, i.e., at moderate velocity and under moderate pressure.

Of these conditions, the first (a) is the most important because, in case of incorrect or insufficiently backwards-bent position of the head of the unconscious person, the entry of air to the lungs is blocked.

The proper position of the lower jaw is also important, although, in case of a far-backwards bent position of the head, air can be fed to the lungs even if the lower jaw is not lifted. In case of proper positioning of the lower jaw, it is sufficient to bend the head backwards to a lesser extent.

The proper selection of the air velocity and of the air pressure is of importance insofar as it is undesirable that air be introduced into the stomach of the unconscious person, which would occur in case the air velocity is too high. However, such mistakes would not principally impair the life-saving effort.

In order to enable a rescuer or life-saver to successfully carry out reviving of unconscious persons, he should practice the reviving steps during training so that, in case of an emergency, he will know to properly and quickly apply all steps necessary to resuscitate an unconscious person. It is not recommended to train a lifesaver or rescuer by practicing these steps on a conscious person, because the respiratory track in such conscious person is not blocked, as is the case in an unconscious person. Furthermore, there is the risk of mutual infection when breathing from mouth to mouth or from mouth to nose. Therefore, an artificial or simulated human form is desirable for demonstrating to and training rescuers or life-savers, whereby all the necessary reviving steps can be applied to such artificial human form.

It is an object of the present invention to provide such simulated human form with means to indicate whether or not the manual steps applied thereto and the insufflation operation for resuscitation are carried out in the proper manner. In other words, the artificial, simulated human form is equipped with means indicating whether the air supplied is fed to the lungs, or is incorrectly applied, in which case the insufflated air cannot be introduced into the lungs, due to blocking of the respiratory track, or is fed to the stomach via the esophagus.

It is another object of the invention to provide such simulated body form, indicating only one or two of the abovementioned three conditions a, b and c for the proper insufflation of the air.

It is a further object of the invention to provide a simulated human form in which all three conditions a, b and c are indicated. However, the manufacture of the latter apparatus is more expensive than that of the aforementioned form, since its mechanism is more complex and, therefore, it will primarily be used in hospitals, universities, etc., while the abovementioned simplified and less expensive apparatus will suitably be employed for training larger groups of persons who only occasionally may act as rescuers.

In the case of a simplified artificial, simulated human body form according to the invention, adapted to demonstrate and teach merely the proper head position, the lower jaw is fixed in such a manner, that the windpipe is not blocked. However, in the case of an artificial simulated human body form for demonstrating and teaching both the proper jaw and the proper head positions, these positions are changeable independently from one another. In view of the greater importance of the proper head position, an embodiment teaching only a proper lower jaw position is of no practical value. Means for demonstrating and teaching the proper air supply are only present in the perfected embodiments of the invention.

The artificial human body form according to the invention comprises a simulated human head adapted to be bent backwards and having a movable lower jaw, said head also being provided with valves responsive to excessive insufflation pressure. Furthermore, said artificial body form comprises means indicating the proper or improper respiration position of the head and/or lower jaw, and/or indicating an excessive insufflation pressure. The indications can be obtained, for example, by inflating bodies representing the lungs or the stomach, or by signal lamps corresponding to these organs, said lamps being lighted up or by energizing acoustical signals.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 shows schematically a longitudinal section through a head of an unconscious person;

FIGURE 2 is a side view of the head and upper portion of the body of an unconscious person;

FIGURE 3 shows a first embodiment of the simulated human body form according to the invention, in longitudinal section, with parts illustrated in side view.

FIGURE 4 is a fragmentary view of the device shown in FIGURE 3, showing how the head of the device can be inclined when bending this head backwards;

FIGURE 5 is a circuit diagram, showing the provision of electric signal lamps in a device according to the invention;

FIGURE 8 is a longitudinal section through a further modification of the invention;

Figure 10:
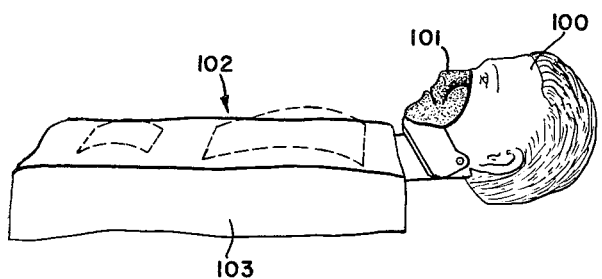

FIGURES 9a, 9b and 9c indicate schematically three different positions of the mechanism used in the embodiment of FIGURE 8;

FIGURE 10 is a perspective view of a simulated human body form according to the present invention.

Referring in more detail to the drawings, FIGURE 1 shows how the tongue of an unconscious person blocks the access of air to the windpipe at $a$ while the lower jaw is dropped.

FIGURE 2 illustrates how this blocking condition can be obviated by bending the head backwards in the direction indicated by arrow II and by lifting the lower jaw in the direction of arrow I.

In the embodiment of the invention shown in FIGURE 3, a part 2 representing the head of an unconscious victim, is provided with a lower jaw 2a which is movable with respect to the head 2 by being guided therein by means of a rod 3 and a roller 5 mounted on the end of said rod and sliding in a guiding channel 6 provided in the head 2. The lower jaw 2a is connected to rod 3 by an element 3a. This sliding mechanism enables the lower jaw 2a to be manually lifted from a dropped position. This upward or lifted position, shown in FIGURE 3, corresponds to the jaw position in which the tongue of the unconscious person is not blocking the windpipe. In order to make it possible for the lower jaw 2a to be brought into a position assumed when opening the mouth, the rod 3 constitutes a leaf spring or is provided with an intermediate resilient portion 3' and the roller 5 has a sufficient play in the guiding channel 6 to permit opening movements of the mouth.

The head 2 of the simulated human form is supported by or on a column 7 mounted on a base or plate 8. The latter is hinged to a base plate 9 on which columns 12 and 13 are provided supporting a platform 14. Inflatable bags 15 and 16 are provided on the platform 14, said bags respectively representing the lungs and the stomach of the unconscious person. The two bags 15 and 16 are covered by a cloth 17.

The simulated human body form in FIGURE 3 indicates the proper or improper execution of the reviving operation as follows: In the case of proper operation, the bag 15 representing the lungs of the unconscious person becomes filled with air, whereby it is inflated and lifts the cloth 17, while in the case of improper operation, the bag 15 is not inflated, because the access of the air is blocked and/or the air is fed to the bag 16, representing the stomach, whereby said bag 16 is inflated. Thus, the trainee can immediately see whether the reviving steps applied are proper and may correct the resuscitation technique.

The admittance of air to the bags 15 or 16 is controlled by valve means 18, the operation of which will be described below. The head 2 is provided with channels or cavities 20, 21, simulating the interior of the nose and mouth of the unconscious person, said channels or cavities being rearwardly connected to inlet sockets 23 or 24 by means of a tube 22, said sockets ending in the cylindrical housing of the valve 18 in which a reciprocating double piston 4 is mounted. This piston is mechanically connected to the lower jaw 2a via the rod 3. If this lower jaw 2a is lifted from the dropped position to the position shown in FIGURE 3, air from the nose and mouth channels or cavities 20 or 21 can flow to the sockets 23 and 24 via the hose 22 and can be discharged from the valve 18 via a hose 25, while the lower part of the double piston 4 simultaneously blocks the connection between the inlet socket 24 and the discharge hose 26. However, if the lower jaw 2a is left in dropped position, or is only insufficiently lifted, the upper part of the double piston 4 blocks the connection between the inlet socket 23 and the discharge hose 25, while the inlet socket 24 and the discharge hose 26 are interconnected, so that air will flow into the bag 16 (stomach) rather than into the bag 15 (lungs), resulting in indication of an improper respiration.

The simulated human form is suitably designed in such a way, that it will indicate the proper respiration only, when the head is bent backwards to the proper angular position. For this purpose, the simulated human body form is further provided with a valve 10, 11, inserted between the discharge hoses 25 and 26, connecting to the valve 18, and hoses 27 and 28, connecting to the bags 15 and 16, respectively. The valve 25, 26 is constructed as a rotary piston valve, the cylindrical housing 10 of which is mounted on the plate 9, while the rotary piston 11 in said housing 10 is secured to the plate 8. The piston has two angularly disposed valve channels 29, of which only one is visible in FIGURES 3 and 4.

In FIGURE 3, the base plates 8 and 9 with the head 2 of the simulated body form are in horizontal position in which the head is not bent backwards and, therefore, the connection of hoses 25 and 26 to the hoses 27 and 28, respectively, is interrupted by the rotary piston 11 in the valve 10, so that no air can flow to the bags 15 and 16. Only after the head 2 has been bent backwards, whereby the hinged plates 8, 9 assume the position indicated in FIGURE 4, the piston 11 is turned so that its channels 29 connect the hose 25 to the hose 27, and the hose 26 to the hose 28, so that flow connection is established between the hose 22 and the hoses 27 and 28. Consequently, in accordance with the position of the double piston 4 in the valve 18, corresponding to the proper or improper position of the lower jaw 2a, either the bag 15 (lungs) or the bag 16 (stomach) will be inflated by air.

A support or foot 30 is provided on the bottom of the plate 8, so that the apparatus can be placed in horizontal position when not in use, as shown in FIGURE 3.

The simulated human body form according to the present invention may be simplified by providing, in place of the bags inflatable by air, electric signal means to indicate the proper or improper respiration (see FIGURE 5). According to this embodiment, the rod 3 connected to the lower jaw 2a and the plates 8 and 9 are associated with electric contact and counter-contact pieces A and B, by means of which, for example, a green signal lamp 31' is energized when the lower jaw and the head are in proper position and, for example, a red signal lamp 32' is lighted up when the lower jaw is in improper position while, in the case of improper position of the head, none of the lamps 31' and 32' is energized.

The portions of the face of the simulated human body form which are relatively hard in human beings should be made of more solid material in the artificial body form while, for the soft portions, deformable or elastic material should be employed. The nose and the mouth are suitably made of such soft material, that it is possible to train the rescuers in closing the nose and the mouth. The cheeks should be made of soft material, so that the trainee will be able to experiment tight application of the face or breathing mask.

Figure 6:
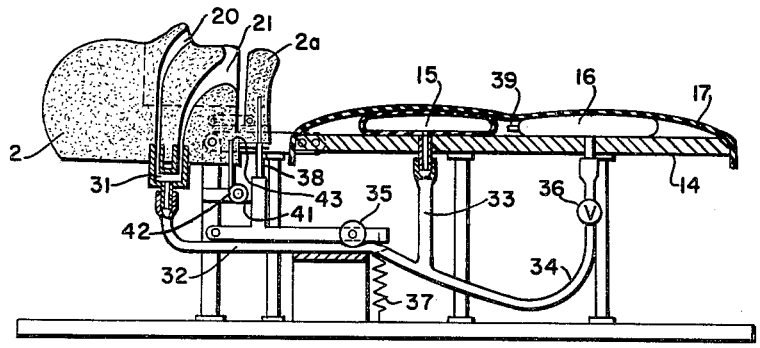
FIGURE 6 shows a modified embodiment of the human body form according to the invention, in longitudinal section, in a similar illustration as that shown in FIGURE 3.
Figure 7:
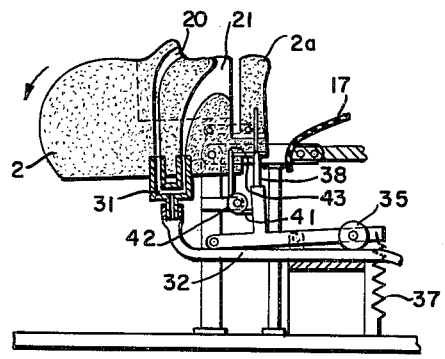
FIGURE 7 is a fragmentary sectional view of the embodiment shown in FIGURE 6, indicating a different position of its head as that illustrated in FIGURE 6.

FIGURES 6 and 7 illustrate an embodiment of the invention having means to indicate whether the air is insufflated at the proper pressure and in the proper amount. In the case of too great an insufflation, or in the case of insufflation of too large amounts of air, the latter will enter the stomach of the unconscious person, which should be prevented. These conditions are simulated in the embodiments of FIGURES 6 and 7, in which the mouth cavity 21 and the nose channel 20 in the head 2 are connected to a socket 31. A hose 32 connects the socket 31 to the bag 15, simulating the lungs, via a branch hose 33, while an end portion 34 of the hose 32 is connected to the bag 16, simulating the stomach. The hose 32 in its center part is associated with a pinch cock 35. A relief pressure valve 36 is provided at the end of the hose 34.

If the head 2 of the simulated human body form is bent forwardly and the lower jaw 2a has dropped, no air can be insufflated, because the pinch cock 35 then squeezes the hose 32 under the action of a spring 37 to thereby block access of air to the bags 15 and 16 (FIGURE 6). However, when the lower jaw 2a of the head 2 is lifted, an inner wire of a Bowden cable 38 attached to the lower jaw 2a lifts the pinch cock 35 from the squeezed portion of the flexible hose 32, overcoming the action of a spring 37, so that air can enter the bag 15. If the head 2 is turned backwards in the direction of the arrow about a pivot 42 to the position shown in FIGURE 7 whereby, in case of an unconscious person, the windpipe is unblocked independently from the position of the lower jaw, a cord 41 connecting the pinch cock 35 at 43 with the head 2 is pulled, overcoming the action of the spring 37, whereby the pinch cock 35 opens the passage for air through the hose 32.

Whether or not, in the case of proper head and proper lower jaw positions, air is flowing into the lungs or also into the stomach depends upon the velocity with which the air is insufflated into the body. In the new apparatus, these conditions are simulated by providing that the air insufflated through the mouth 21 and the nose 20, in case of moderate velocity, will flow only to the lungs, i.e., to the bag 15, via the hoses 32 and 33, because the relief pressure valve 36 at the end of the hose 34 does not permit air passage. If the air velocity is excessively high, i.e., so high that the relief pressure valve 36 opens, the stomach, i.e., the bag 16, will be inflated. In this way, the trainee can determine the proper, i.e., rather low, insufflation pressure by experimenting with the artificial human form. The channels 20 of the nose should be made so narrow that, even in the case of a strong insufflation pressure, it will be impossible to inflate the bag or stomach 16 via these channels.

The relief pressure valve 36 may be constructed as a spring-loaded or a weight-loaded valve. It is possible to load the top of the stomach or bag 16 by placing a weight thereon, closing the end of the hose 34. A nozzle 39 in the wall of the bag 16 is provided for discharging the air therefrom.

The head 2 of the artificial human body form is suitably designed in such a manner, that the mouth and the nose are an exchangeable part which may be made of deformable materials, such as rubber, and said part can be readily removed after use, in order to be cleaned and/or sterilized.

In the further embodiment of the invention, shown in FIGURE 8, the head 2 is carried by an inner supporting plate 48 and comprises a face portion 49 to which a readily removable combined mouth and nose part 50 is detachably secured. The body of the human form is simulated by a base or plate 51 having a substantially vertical wall 52. The bag 15, simulating the lungs, preferably is made of polyethylene and is readily exchangeable. A rubber plate 53 is placed on the bag 15, said plate, due to its weight, being adapted to empty the bag 15 relatively quickly during exhaling.

The lower jaw 2a is held by or linked to a rod 55 at 54, said rod being rotatably mounted on a bracket 56 secured to the plate 48. The rod 55 is guided in an aperture 57 of a guide means 58, also mounted on the plate 48. The ends of the aperture 57 limit the movements of the rod 55 and, thereby, the lifting and lowering motions of the lower jaw 2a.

The plate 48 is rockably mounted on a plate 59 at 60, said plate 59 simulating the human neck or throat and being hingedly connected at 61 to the wall 52.

FIGURES 9a, 9b and 9c indicate different head positions of the embodiment of FIGURE 8, of which the position 9a corresponds to the position of an unconscious person with his head bent forwardly. The position 9b is that in which the head is bent backwardly, however, insufficiently for a proper respiration, while the position 9c shows the maximum rearwardly bent position which is necessary or desirable for proper respiration. In these three positions, the lower jaw may be either dropped or lifted.

In the position 9a, access of air to the lungs is blocked, even if the lower jaw is lifted. In the position 9b, access of air is blocked if the lower jaw is dropped. However, air can be admitted to the lungs if the lower jaw is lifted. In the position 9c, access of air to the lungs is always possible, regardless of the position of the lower jaw.

In FIGURE 8, the combined mouth and nose part 50 is connected to a nozzle or socket 62 which, in turn, is connected to a hose 63. The latter leads to the bag 15 (lungs), passing through the throat portion 59. If air is insufflated into the mouth or the nose, the bag 15 simulating the lungs is inflated. The air is discharged when insufflation is interrupted, due to the weight of the plate 53 acting on the bag 15. However, in the position 9a, the flexible hose 63 in the throat portion 59 is squeezed by means of a pinch cock 64, designed as a lever, under the action of a spring 65. A lever 67 can rock about a pivot 66 of the pinch cock 64 until the lever 67 engages an arm 68 of said pinch cock. The lever 67 when in the position 9a is removed from the arm 68 under the action of a spring 69. A rope 70 is connected to the arm 68, said rope connecting to the rod 55 of the lower jaw 2a via a roller 71 journalled at 60 and via a roller 72. If the lower jaw 2a is lifted while the head is in the position 9a, the jaw pulls the rope 70. However, due to the abutments in the aperture 57, the movements of the lower jaw are limited to such extent that the lever 67 will not engage the arm 68 of the pinch cock 64, i.e., will not open the same. Thus, when the head is in the position of FIGURE 9a, no air can be insufflated in the bag 15, simulating the lungs, regardless of the position of the lower jaw.

If the head is turned to the position shown in FIGURE 9b, the roller 71 is moved and the rope 70 is pulled to a greater extent, i.e., even in the case of a dropped lower jaw 2a, the lever 67 of the pinch cock 64 engages the arm 68 of this pinch cock 64 and lifts the same from the flexible hose 63, due to turning of said arm when the jaw is lifted. Thus, in this head position, lifting of the lower jaw opens the respiratory tract.

If the head is turned rearwardly to the optimum position shown in FIGURE 9c, the roller 71 pulls the rope 70 to a greater extent, whereby the lever 67 will engage the arm 68 of the pinch cock 64 and lift the same from the hose 63, although the lower jaw is in dropped position.

Suitably, all of the parts through which insufflated air is passed are constructed and arranged in such a way that they can be removed and exchanged without using tools, so that they can be readily disinfected or sterilized.

FIGURE 8 shows how the apparatus can be designed with means indicating insufflation of air into the stomach. For this purpose, the hose 63 is provided with a branch, so that the bag 15 (lung) can be inflated as shown in the foregoing. The branch of the hose 63 comprises a hose 74 associated with a pinch cock 75. The latter is held in open, i.e., lifted position by means of a spring 76 in the positions of FIGURES 9a and 9b. Consequently, in these improper head positions, air will be insufflated in the bag 16 (stomach) connected to the hose 74. A rope 77, running over a roller 78, is pulled during turning of the head to the extreme backwards position of FIGURE 9c, thereby causing the pinch cock 75 to shut off the hose 74 by squeezing the same. A spring 79, inserted in the rope 77, permits a certain tolerance during pulling of the rope 77. As a result of this, no air can be insufflated into the bag 16 (stomach) in the position of the head according to FIGURE 9c.

In the position 9b, the air will enter the stomach only if insufflated at too high a pressure. In order to demonstrate this action, a relief pressure valve 38 is inserted in the hose 74 connecting the hose 63 to the bag 16 (stomach), said relief pressure valve 38 opening when a higher pressure is applied.

In contrast to the arrangement of a cover for the bag 15, representing the lung, no cover is provided for the bag 16, representing the stomach, because the latter does not automatically discharge the air.

Suitably, not only the combined mouth and nose part, but also the lung and stomach bags and all the other parts of the apparatus carrying air are made in such a way that they can be readily exchanged. FIGURE 10 shows the human body form according to the present invention in perspective, the head being indicated at 100, the exchangeable nose and mouth part at 101, and the thorax portion at 102. The latter is covered by a sheet 103, the dashed lines indicating the shape assumed by the sheet upon inflation of the respective bags.

I claim:

1. An artificial human body form for demonstrating and practicing reviving of unconscious persons comprising, a simulated human head, said head having at least one passage with an opening for insufflating air; means to adjust said head to different positions including improper and proper positions for resuscitating insufflation; and means responsive to said positions and acted upon by insufflated air to indicate whether the insufflation is taking place improperly or properly.

2. An artificial human body form according to claim 1, wherein said indicating means comprises an inflatable bag simulating the human lungs, said bag being connected to said air passage in said head, and wherein valve means are inserted between said passage and said bag, said valve means being operatively connected to said means for adjusting said head in different positions so as to shut off said bag from air insufflated through said passage when the head is in improper position and to connect said passage to said bag when said head is in proper position.

3. An artificial human body form according to claim 2, wherein said valve means connects said passage to said bag only when said head is in a backwardly-bent position.

4. An artificial human body form according to claim 2, a lower jaw displaceably mounted on said head; a second valve means inserted between said passage and said bag and operatively connected to said lower jaw in such a manner that, when the jaw is in dropped position, said second valve means shuts off said bag while, when said lower jaw is in lifted position, said second valve means connects said passage to said bag.

5. An artificial human body form according to claim 2, wherein an inflatable bag simulating the human stomach is provided and is likewise connected to said passage in said head via said valve means.

6. An artificial human body form according to claim 5, a lower jaw displaceably mounted on said head, a second valve means inserted between said passage and said first valve means and operatively connected to said lower jaw in such a manner that, when the latter is in dropped position, said second valve means shuts off its connection to said bag simulating the lungs and opens its connection to said bag simulating the stomach while, when said lower jaw is in lifted position, said valve means opens its connection to said bag simulating the lungs and shuts off its connection to said bag simulating the stomach, and said first valve means being of the rotary piston type having separate, angularly disposed channels in the rotary piston for independently connecting respective separate outlets in said second valve means to said two bags.

7. An artificial human body form according to claim 5, wherein a pressure relief valve is inserted between said bag simulating the stomach and said passage, said relief valve being adjusted to such value that, in case of too great an insufflation pressure, and in case of excessive filling of the bag representing the lungs, said relief valve responds to permit flow of insufflated air into said bag simulating the stomach.

8. An artificial human body form according to claim 4, wherein said second valve means operated by said lower jaw is a pinch cock valve associated with a flexible hose connecting said passage with said bag.

9. An artificial human body form according to claim 1, wherein a simulated mouth is provided on said head, said passage ending in said mouth.

10. An artificial human body form according to claim 9, wherein a simulated nose is provided on said head, said nose having a second passage in communication with said first passage.

11. An artificial human body form according to claim 1, wherein said nose and said mouth form an integral part readily removable from said head.

12. An artificial human body form according to claim 1, wherein said indicating means comprises electric signal circuits with electric lamps, and wherein said circuits include switch means operated by the positions of said head and controlling said lamps in accordance with said positions.

13. A mechanical model for teaching mouth to mouth resuscitation, comprising a mannequin having a simulated human head, said head having at least one passage with an opening for insufflating air, means associated with said passage in said mannequin for simulating lung action thereof as indicated by apparent rising and falling of said means due to insufflated air when mouth to mouth resuscitation is practiced thereon, and means coacting with said passage for preventing the simulated lung action when all of the steps necessary for mouth to mouth resuscitation are not practiced.

References Cited in the file of this patent

UNITED STATES PATENTS 2,904,898    Marsden    Sept. 22, 1959

FOREIGN PATENTS 791,741    Great Britain    Mar. 12, 1958